(12) United States Patent
Moon et al.

(10) Patent No.: US 11,799,380 B2
(45) Date of Patent: Oct. 24, 2023

(54) HYBRID CONTROL OF SWITCHING POWER CONVERTERS

(71) Applicant: SEMICONDUCTOR COMPONENTS INDUSTRIES, LLC, Phoenix, AZ (US)

(72) Inventors: Sangcheol Moon, Bucheon-si (KR); Dongjin Park, Siheung (KR); Jihoon Jang, Incheon (KR)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 425 days.

(21) Appl. No.: 16/839,185

(22) Filed: Apr. 3, 2020

(65) Prior Publication Data

US 2021/0313894 A1 Oct. 7, 2021

(51) Int. Cl.
*H02M 3/335* (2006.01)
*H02M 1/36* (2007.01)
*H02M 1/00* (2006.01)

(52) U.S. Cl.
CPC ......... *H02M 3/33569* (2013.01); *H02M 1/36* (2013.01); *H02M 1/0009* (2021.05)

(58) Field of Classification Search
CPC .... H02M 1/36; H02M 1/009; H02M 3/33569; H02M 3/01; H02M 3/015; H02M 3/22; H02M 3/24; H02M 3/28; H02M 3/315; H02M 3/3155; H02M 3/325; H02M 3/335; H02M 3/33507; H02M 3/33515; H02M 3/33523; H02M 3/33553; H02M 3/33538; H02M 3/33546; H02M 3/33553; H02M 3/33561; H02M 3/33571; H02M 3/33573; H02M 3/33576; H02M 3/33584; H02M 3/33592; H02M 1/0003; H02M 1/0009; H02M 1/0016; H02M 1/0019; H02M 1/0025; H02M 1/0032; H02M 1/0035;
(Continued)

(56) References Cited

U.S. PATENT DOCUMENTS 6,518,738 B1 * 2/2003 Wang ............... H02M 3/156
323/284
9,312,844 B2 * 4/2016 Darmawaskita ......... H03K 6/04
(Continued)

FOREIGN PATENT DOCUMENTS

JP 2005269807 * 9/2005

OTHER PUBLICATIONS

English Translation of JP2005269807 (Year: 2005).*
(Continued)

*Primary Examiner* — Thienvu V Tran
*Assistant Examiner* — Carlos O Rivera-Perez
(74) *Attorney, Agent, or Firm* — Dickinson Wright PLLC; Mark E. Scott

(57) ABSTRACT

Hybrid control of switching power converters. One example embodiment is a method including: operating the switching power converter such that a charge control switch has a conduction time in each switching cycle; and making adjustments to the conduction time, the adjustments dominated by voltage-mode control when the switching power supply is in a first operational state, and the adjustments dominated by current-mode control when the switching power supply is in a second operational state distinct from the first operational state.

19 Claims, 7 Drawing Sheets

(58) Field of Classification Search
CPC .... H02M 1/0095; H02M 1/42; H02M 1/4233; H02M 1/4241; H02M 1/4258; Y02B 70/10
USPC .. 363/15–21.18, 40–43, 74, 89, 95–99, 123, 363/131–134; 323/271–275, 277, 280, 323/282–288, 351
See application file for complete search history.

(56) References Cited

U.S. PATENT DOCUMENTS

| | | | |
|---|---|---|---|
| 10,171,003 B1* | 1/2019 | Adragna | H02M 3/33569 |
| 2009/0073733 A1* | 3/2009 | Balakrishnan | H02M 3/33515 |
| | | | 363/95 |

OTHER PUBLICATIONS

"Advanced Pulse Frequency Modulation (PFM) Controller for Half-Bridge Resonant Converters," Fairchild Semiconductor Product Description Publication No. FAN7631, Apr. 2012, 21 pages, Copyright 2011 Fairchild Semiconductor Corporation.

"Advanced Secondary Side LLC Resonant Converter Controller with Synchronous Rectifier Control," Fairchild Semiconductor Product Description Publication No. FAN7688, Nov. 2015, 33 pages, Copyright 2015 Fairchild Semiconductor Corporation.

"High Performance Resonant Mode Controller with Integrated High-Voltage Drivers," ON Semiconductor Product Description Publication No. NCP1397D, Oct. 2015—Rev. 6, 27 pages, Copyright Semiconductor Components Industries, LLC.

"Current Mode Resonant Controller, with Integrated High-Voltage Drivers, High Performance," ON Semiconductor Product Description Publication No. NCP1399D, Oct. 2019—Rev. 17, 45 pages, Copyright Semiconductor Components Industries, LLC 2016.

* cited by examiner

US 11,799,380 B2

HYBRID CONTROL OF SWITCHING POWER CONVERTERS

CROSS-REFERENCE TO RELATED APPLICATIONS

Not Applicable.

BACKGROUND

Switching power converters have several modes of operation. For example, switching power converters can be operated in voltage-mode control where the switching power converter ends a charge mode of an inductance (e.g., inductor, primary winding of a transformer) in each switching cycle based on a voltage error signal and ramp signal. However, voltage-mode control has slow dynamic response, particularly in high load situations. As another example, switching power converters can be operated in current-mode control where the switching power converter ends the charge mode of the inductance in each cycle based on a value indicative of electrical current through the inductance. However, current-mode control has poor output voltage regulation in light load situations.

BRIEF DESCRIPTION OF THE DRAWINGS

For a detailed description of example embodiments, reference will now be made to the accompanying drawings in which.

DEFINITIONS

Figure 1:
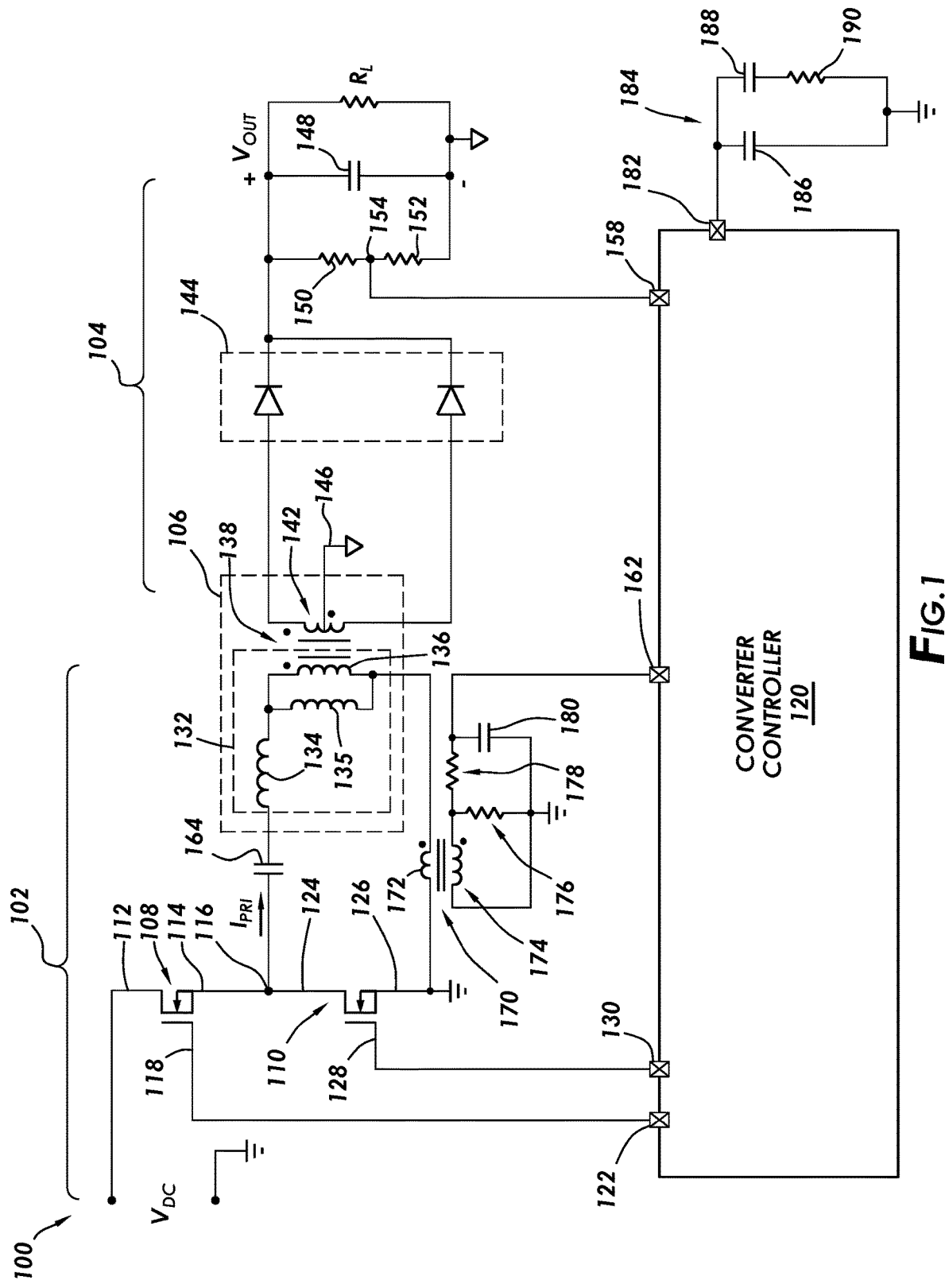
FIG. 1 shows a resonant power converter in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

In relation to electrical devices (whether stand alone or as part of an integrated circuit), the terms "input" and "output" refer to electrical connections to the electrical devices, and shall not be read as verbs requiring action. For example, a differential amplifier (such as an operational amplifier) may have a first differential input and a second differential input, and these "inputs" define electrical connections to the operational amplifier, and shall not be read to require inputting signals to the operational amplifier.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various example embodiments are directed to hybrid control of switching power converters. In particular, example embodiments are directed to switching power converters having multiple operational states. In some operational states (e.g., high loads), adjustments to conduction time of a charge control switch are dominated by voltage-mode control. In other operational states (e.g., low loads), adjustments to conduction time of a charge control switch are dominated by current-mode control. More particularly still, at least some example embodiments are directed to converter controllers that internally create a ramp signal with a slope inversely proportional to an output voltage error, create a hybrid signal by combining the ramp signal and a signal indicative of current in the inductance, and set or adjust the conduction time of a charge control switch based on the hybrid signal. The various embodiments were developed in the context of inductor-inductor-capacitor (LLC) converters, and thus the description that follows is based on the developmental context. However, the various embodiments find use in other switching power converters (e.g., non-isolated buck converters, isolated buck converters, flyback power converters, forward converters), and it follows the developmental context shall not be read as a limitation.

FIG. 1 shows a resonant power converter in accordance with at least some embodiments. In particular, working from left to right in FIG. 1, the resonant power converter 100 comprises a high-side electrically-controlled switch in the example form of a high-side field effect transistor (FET) 108. The high-side FET 108 has a drain or first connection 112 coupled to the input direct current (DC) voltage (hereafter input voltage VDc), and a source or second connection 114 coupled to a switch node 116. The gate or control input 118 of the high-side FET 108 is coupled to a converter controller 120 by way of a high-gate terminal 122. When commanded by the converter controller 120 by assertion of the control input 118, the high-side FET 108 couples the switch node 116 (and thus transformer 106) to the input voltage VDC, and thus the high-side FET 108 may be considered a charge control switch. FIG. 1 further comprises a low-side electrically controlled switch in the example form of a low-side FET 110. The low-side FET 110 has a drain or first connection 124 coupled to the switch node 116, and a source or second connection 126 coupled to ground on the primary side 102. The gate or control input 128 of the low-side FET 110 is coupled to the converter controller 120 by way of a low-gate terminal 130. When commanded by the converter controller 120 by assertion of the control input 128, the low-side FET 110 couples the switch node 116 to ground on the primary side. And thus the low-side FET 110 may be considered a charge control switch. In operation, the resonant power converter 100 alternately couples the switch node 116 to the input voltage VDC and then to ground by way of the high-side FET 108 and low-side FET 110, respectively, creating an alternating current (AC) signal at the switch node 116 In order not to short the input voltage VDC, the converter controller 120 is designed and constructed such that the high-side FET 108 and low-side FET 110 are not simultaneously commanded to conduct (i.e., there is a dead zone or dead band of time between assertion of the respective gates).

The switch node 116 is coupled to the primary winding 132 of the transformer 106 by way of a capacitor 164. The primary winding 132 in FIG. 1 is shown as a separate leakage inductance 134, magnetizing inductance 135, and an ideal winding 136. It will be appreciated that the primary winding 132 does not have the separately shown inductances; rather, the leakage inductance 134, magnetizing inductance 135, and ideal winding 136 represent a model for understanding operation of the transformer. The leakage inductance 134, magnetizing inductance 135, and capacitor 164 thus create a tank circuit or LLC resonant circuit on the primary side 102. Depending on the specific design of the resonant power converter 100, an additional inductor may be included in the circuit (e.g., between the capacitor 164 and the primary winding 132). The AC signal driven to the switch node 116 has a frequency that may be at or near the resonant frequency of the tank circuit in full load or near full load operating conditions, and the AC signal has a frequency higher than the resonant frequency at loads below full load.

The example primary side 102 further comprises a current sense transformer 170 comprising a primary winding 172 coupled between the primary winding 132 of the transformer 106 and ground on the primary side 102. The current sense transformer 170 further comprises a secondary winding 174 coupled to a current-sense terminal 162 of the converter controller 120 by way of an RC network. The example RC network comprises a resistor 176 coupled between the first and second leads of the secondary winding 174, a resistor 178 coupled between the secondary winding 174 and the current-sense terminal 162, and a capacitor 180 coupled between the current-sense terminal 162 and ground on the primary side 102. The RC network forms a low-pass filter for a signal indicative of primary current supplied to the current-sense terminal 162.

Still referring to FIG. 1, the transformer 106 further comprises a secondary winding 142 coupled to a full-wave rectifier 144. The example secondary winding 142 has a center tap 146 coupled to common on the secondary side 104. The other terminals of the secondary winding 142 are coupled to the example full-wave rectifier 144 illustratively shown as two diodes. In other cases, the center tap 146 may be electrically floated, and the two remaining terminals may be coupled to a bridge rectifier having four diodes. In yet still further cases, rectification on the secondary side may be by way of electrically controlled switches (e.g., FETs) that are not specifically shown. The example full-wave rectifier 144 is coupled to a smoothing capacitor 148 which filters the rectified signal produced by the full-wave rectifier 144 to create the output voltage $V_{OUT}$. In the example system, a load is illustratively shown as a resistor $R_L$ (hereafter "load $R_L$") coupled across the output voltage $V_{OUT}$. In the example arrangement shown, the secondary winding 142 produces a signal with a positive voltage relative to ground based on current flow from the primary winding 132 to the ground on the primary side 102, and the secondary winding 142 produces a signal with a negative voltage relative to ground when current flows in the opposite direction on the primary side 102 (e.g., based on the LC oscillations).

In the example system, the converter controller 120 may sense output voltage $V_{OUT}$ as part of the overall control strategy. In particular, the example system has a voltage divider illustratively comprising a resistor 150 and a resistor 152 coupled in series. Resistor 150 is coupled to the positive node of the output voltage $V_{OUT}$, and resistor 152 is coupled to the negative node of the output voltage $V_{OUT}$ (e.g., ground or common on the secondary side 104). The resistors 150 and 152 define a sense node 154 between them, and the sense node 154 is coupled to a feedback terminal 158 of the converter controller 120. Thus, the voltage divider creates a signal indicative of output voltage provided to the feedback terminal 158. The example converter controller 120 further defines a compensation terminal 182 coupled to a compensation network 184. The example compensation network is used as a filter in the feedback loop based on the output voltage $V_{OUT}$ (the feedback loop discussed more below). The example compensation network 184 comprises a capacitor 186 coupled between the compensation terminal 182 and ground. The example compensation network also comprises an RC circuit in the form a capacitor 188 in series with a resistor 190, and with the capacitor 188 and resistor 190 coupled between the compensation terminal 182 and ground.

In operation, the high-side FET 108 and low-side FET 110 alternately couple the switch node 116 to the input voltage VDC and ground, respectively, thus creating the AC signal applied to the primary winding 132 by way of capacitor 164. The AC signal applied to the primary winding 132 is transferred across the transformer 106 to create an AC signal on the secondary winding 142, with the voltage relationship between the AC signal on the primary winding and the AC signal on the secondary winding based on the turns ratio of the transformer (and with the polarity based on the dot-convention as shown). The AC signal created on the secondary winding 142 is then rectified by the example full-wave rectifier 144 and smoothed to create the output voltage $V_{OUT}$ applied to the load $R_L$.

In the case of an LLC resonant converter, the example converter controller 120 controls the frequency of the AC signal at the switch node 116 (i.e., controls the frequency of the assertion of the gate signals to the high-side FET 108 and low-side FET 110). In accordance with example embodiments, the frequency of the gate signals applied to the high-side FET 108 and low-side FET 110, and thus the fundamental frequency of the AC signal at the switch node 116, is managed or controlled based on several signals. One example signal may be the signal indicative of output voltage sensed at the feedback terminal 158. Another example signal used by the converter controller 120 may be a signal indicative of current in the primary winding sensed at the current-sense terminal 162.

In LLC converters, the switching frequency is adjusted based on load. As load goes up, switching frequency goes down, with highest load supplied as the LLC converter operates at or near the resonant frequency of the LLC circuit on the primary side 102. Oppositely, as load goes down, switching frequency goes up. Controlling power supplied based on switching frequency is sometimes referred to as pulse frequency control (PFC) or pulse frequency modulation (PFM). Stated equivalently but in terms of conduction time, in LLC converters the conduction time of the high-side FET and the conduction time of the low-side FET are adjusted based on load. As load goes up, conduction time of each power FET is longer. Oppositely, as load goes down conduction time of each power FET is shorter.

Figure 2:
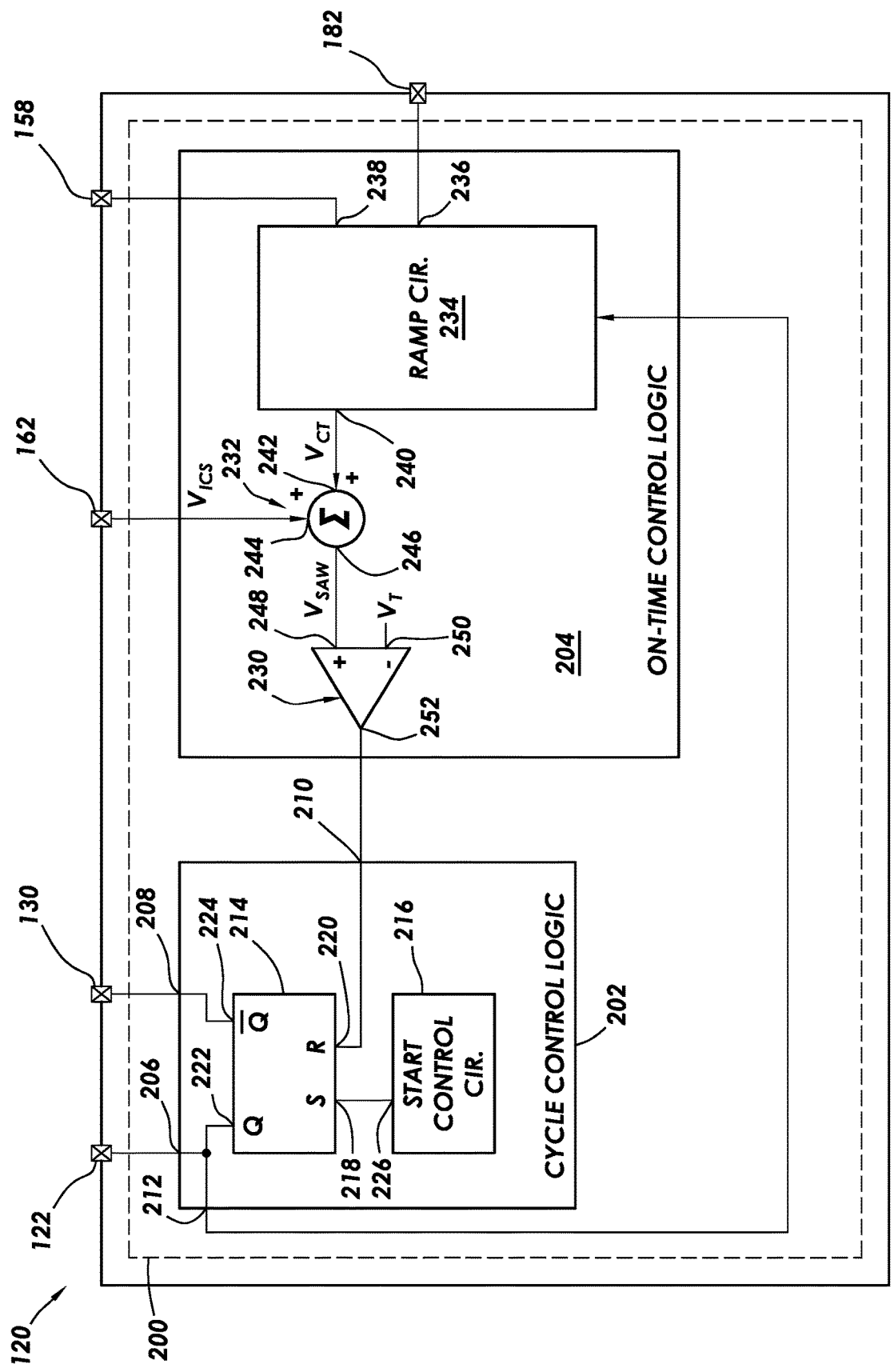
FIG. 2 shows a block diagram of a converter controller in accordance with at least some embodiments.

FIG. 2 shows a block diagram of a converter controller 120 in accordance with at least some embodiments. In particular, the example converter controller 120 is a packaged semiconductor device or packaged integrated circuit device having a plurality of externally accessible pins or terminals. Visible in FIG. 2 are the high-gate terminal 122, the low-gate terminal 130, the current-sense terminal 162, the feedback terminal 158, and the compensation terminal 182. Various other terminals would be present (e.g., power terminal, ground terminal, additional sensing terminals), but the additional terminals are not shown so as not to unduly complicate the figure. Within the packaged device resides a semiconductor die 200 upon which the various electrical circuits are monolithically constructed. While FIG. 2 shows only a single semiconductor die 200, two or more semiconductor dies may be packaged together (e.g., a multi-chip module) to create the converter controller 120.

The example converter controller 120 defines a cycle control logic 202 and an on-time control logic 204. The example cycle control logic 202 defines a high-gate output 206, a low-gate output 208, a trigger input 210, and a gate status output 212. The cycle control logic 202 is configured to periodically assert the high-gate output 206 (and thus assert the high-gate terminal 122), while holding the low-gate output 208 (and thus the low-gate terminal 130) de-asserted. Upon assertion of the trigger input 210, the example cycle control logic 202 de-asserts the high-gate terminal 122, and after a predetermined dead time, asserts the low-gate terminal 130 while holding the high-gate terminal 122 de-asserted. When the converter controller 120 is used in a resonant power converter, such as the resonant power converter 100 of FIG. 1, the cycle control logic 202 is configured to measure the on time of the high-gate terminal 122, and assert the low-gate terminal 130 for a substantially equivalent period of time to the on time. It follows that, when controlling resonant power converters, the switching frequency is variable and the start time of each switching period is likewise variable.

However, the converter controller 120 of FIG. 2 is merely an example controller used for controlling a resonant power converter. Other converter controllers designed and operated in accordance with the principles disclosed herein may control different types of power converters (e.g., a flyback power converter), and thus the cycle control logic may drive a single gate terminal, may operate at fixed frequency with variable duty cycle, and/or may have a fixed start time in each cycle as controlled by an internal or external oscillator.

Still referring to FIG. 2, the example cycle control logic 202 comprises a latch 214 that defines a start input 218, a stop input 220, a latch output 222, and a logical NOT of the latch output (hereafter just inverse output 224). The example latch 214 is shown as a set-reset flip-flop for clarity, but any suitable latch circuit may be used. The start input 218 is coupled to the start control circuit 216. The stop input 220 defines the trigger input 210. The example latch 214 asserts the latch output 222 based on assertion of the start input 218, and the latch 214 de-asserts the latch output 222 and asserts inverse output 224 based on assertion of the stop input 220. If the latch 214 provides insufficient dead time between de-assertion of the latch output 222 and assertion of the inverse output 224, then additional circuits may be used to implement the designed dead time.

The example start control circuit 216 may take many forms depending on the nature of the power converter controlled by the converter controller. In the example case of a converter controller 120 designed to control a resonant power converter such as shown in FIG. 1, the start control circuit 216 may measure on time or conduction time as the time between assertion of the high-gate terminal 122 and de-assertion of the high-gate terminal 122. The example start control circuit 216 enables or allows the low-gate terminal 130 to be asserted for the conduction time just measured, and then asserts the start output 226 to begin the cycle anew. The connections to the start control circuit 216 to perform the monitoring (e.g., connection to the latch output 222 and trigger input 210) are not expressly shown. In an example case of the converter controller designed to control a flyback power converter or a forward power converter, the start control circuit 216 may assert the start output 226 at a fixed frequency, and the trigger input may be asserted to control peak current in the primary winding of the flyback power converter.

Still referring to FIG. 2, the example converter controller 120 further comprises the on-time control logic 204. The example on-time control logic 204 comprises a comparator 230, a summer 232, and a ramp circuit 234. The example ramp circuit 234 defines a compensation input 236, a feedback input 238, and a ramp output 240. The compensation input 236 is coupled to the compensation terminal 182, and is thus coupled to the compensation network 184 (FIG. 1). The feedback input 238 is coupled to the feedback terminal 158 and thus the signal indicative of output voltage. The example ramp circuit 234 creates a ramp signal on the ramp output 240 where a slope of the ramp signal is proportional to a voltage error. In one example system, the ramp circuit 234 creates the ramp signal with a positive slope that is inversely proportional to voltage error, such that for large voltage errors the slope of the ramp signal is smaller, and for small voltage errors the slope of the ramp signal is greater.

The summer 232 defines a first input 242, a second input 244, and sum output 246. The first input 242 is coupled to the ramp output 240, and thus the summer 232 receives the ramp signal from the ramp circuit 234. The second input 244 is coupled to the current-sense terminal 162, and thus the summer 232 receives the signal indicative of primary current. The example summer 232 is designed and construed to combine or sum the ramp signal and the signal indicative of primary current, and produce a hybrid signal on the sum output 246.

Still referring to FIG. 2, the comparator 230 defines a non-inverting input 248, and inverting input 250, and compare output 252. The non-inverting input 248 is coupled to the sum output 246, and thus the comparator 230 receives the hybrid signal on the non-inverting input 248. The inverting input 250 is coupled to a threshold voltage $V_T$. The compare output 252 defines trigger input 210 of the cycle control logic 202. Thus, the comparator 230 compares the hybrid signal to the threshold voltage $V_T$, and asserts the compare output 252 when the magnitude of hybrid signal crosses the threshold voltage $V_T$. In an example case of a converter controller designed to control a resonant power converter such as shown in FIG. 1, assertion of the compare output 252 thus ends the conduction time of the high-side FET 108, begins the corresponding conduction time of the low-side FET 110, and thus controls the switching frequency of the resonant power converter. In an example case of the converter controller designed to control a flyback power converter or a forward power converter, assertion of the compare output 252 thus ends the conduction a primary FET, and thus controls duty cycle of the charge control switch. The discussion now turns to waveforms to illustrate example operation.

Figure 3:
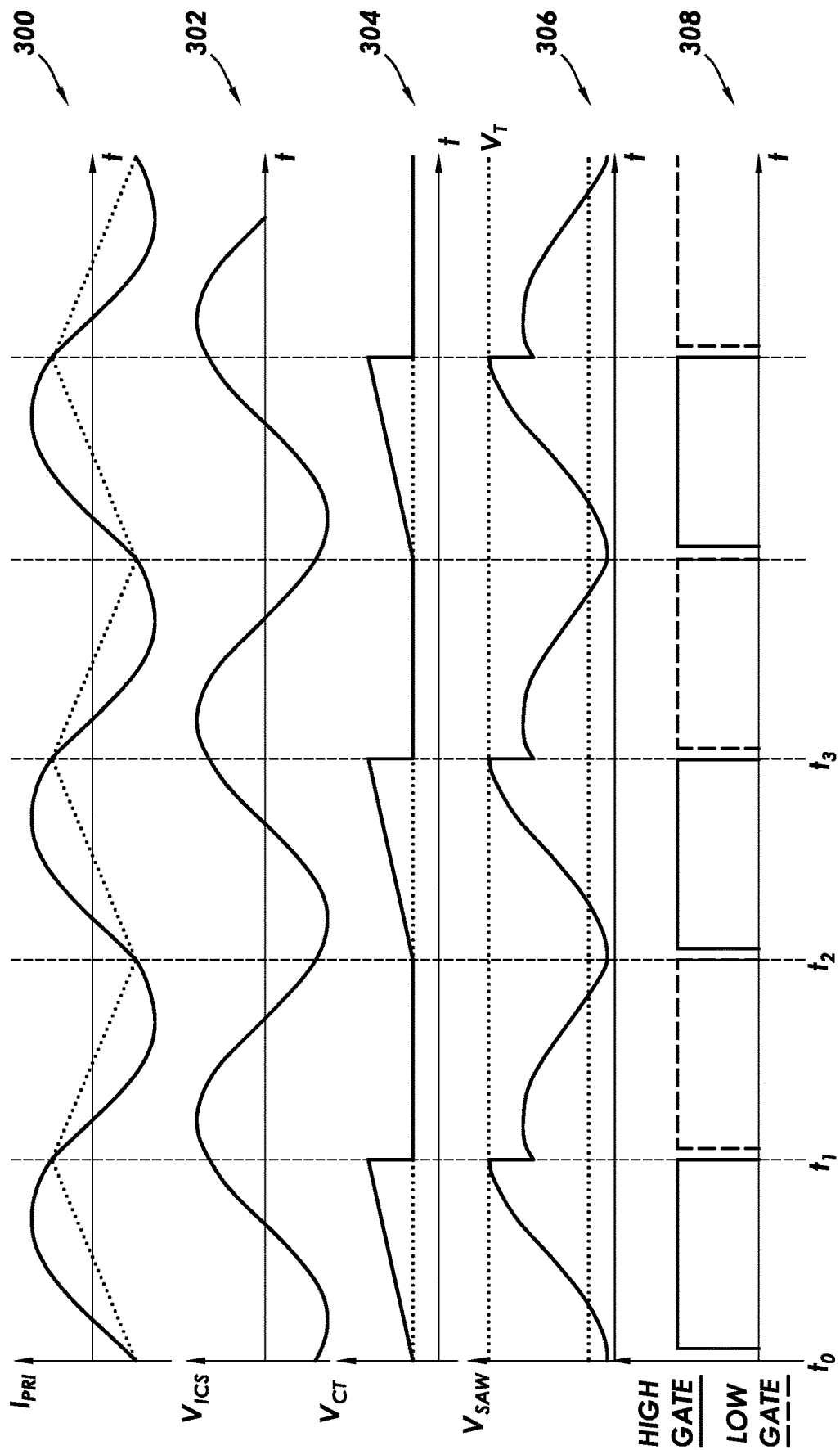
FIG. 3 is a timing diagram in accordance with at least some embodiments.

FIG. 3 is a timing diagram in accordance with at least some embodiments. In particular, FIG. 3 illustrates switching cycles in an operational state of the resonant power converter of FIG. 1 in which the resonant power converter is providing relatively high current and thus high load. Plot 300 shows an example primary current waveform $I_{PRI}$ (solid line) and magnetizing current waveform (dashed line). Plot 302 shows an example waveform of the signal indicative of primary current $V_{ICS}$. Plot 304 shows an example waveform of a ramp signal $V_{CT}$ created based on voltage error. Plot 306 shows an example waveform of a hybrid signal $V_{SAW}$. And plot 308 shows an example high-gate signal (solid line) and low-gate signal (dashed line). The plots of FIG. 3 are plotted on corresponding time scales; however, the plots are not necessarily to scale.

Time period t0 to t1 represents a period of time in which the high-side FET 108 is conductive and the low-side FET 110 is non-conductive, as shown by plot 308. During the time period t0 to t1 the current through the primary winding $I_{PRI}$ is rising, as shown by plot 300. Because of the RC network associated with the current sense transformer 170, the signal indicative of primary current $V_{ICS}$ lags the primary current, but nevertheless the signal indicative of primary current $V_{ICS}$ follows the primary current, as shown in plot 302. Inasmuch as the example set of plots are representative of the resonant power converter providing relatively high load, the magnetizing current component of the primary current $I_{PRI}$ has a relatively large peak-to-peak magnitude, and the signal indicative of primary current $V_{ICS}$ likewise has a relatively large peak-to-peak magnitude.

Still considering time period t0 to t1, consider for purposes of explanation that in the operational state illustrated by the plots of FIG. 3 the resonant power converter has a low voltage error. Stated otherwise, the output voltage $V_{OUT}$ is near the set point. During the time period t0 to t1 the converter controller 120, and in particular the ramp circuit 234, produces the ramp signal $V_{CT}$. Under the assumptions, the ramp signal $V_{CT}$ has a slope that is positive and relatively low, as shown in plot 304.

The example converter controller 120, and in particular the on-time control logic 204, produces a hybrid signal $V_{SAW}$. In example case, the hybrid signal $V_{SAW}$ is the summation of the signal indicative of primary current $V_{ICS}$ and the ramp signal $V_{CT}$, as shown in plot 306. In accordance with example embodiments, the converter controller 120 ends the conduction time of the high-side FET 108 when the magnitude of the hybrid signal $V_{SAW}$ crosses the predetermined threshold $V_T$. Thus, at time t1 the high-gate signal is de-asserted, and after a predetermined dead time, the low-gate signal is asserted, as shown in plot 308.

Still considering the time period t0 to t1, the example hybrid signal $V_{SAW}$ is dominated by the signal indicative of primary current $V_{ICS}$. That is to say, the contribution of the signal indicative of primary current $V_{ICS}$ outweighs the contribution of the ramp signal $V_{CT}$. Stated yet another way, within the time period, a peak magnitude of the signal indicative of primary current $V_{ICS}$ has a greater contribution to the peak magnitude of the hybrid signal $V_{SAW}$ than the peak magnitude of the ramp signal $V_{CT}$. From a control standpoint, having the signal indicative of primary current $V_{ICS}$ being the predominant portion of the hybrid signal $V_{SAW}$ results in the control strategy being dominated by current-mode control. Current-mode control is inherently more stable in high current and thus high load situations.

Now consider time period t1 to t2. Time period t1 to t2 represents a period of time in which the low-side FET 110 is conductive and the high-side FET 108 is non-conductive, as shown by plot 308. During the time period t1 to t2 the magnetizing current is falling, as shown by plot 300. Again because of the RC network associated with the current sense transformer 170, the signal indicative of primary current $V_{ICS}$ lags the primary current, but nevertheless the signal indicative of primary current $V_{ICS}$ follows the primary current, as shown in plot 302.

When controlling a resonant power converter, the example converter controller 120 measures the conduction time of the high-side FET 108, and the converter controller 120 makes the low-side FET 110 conductive for about the same conduction time to enable the primary current to reverse direction, thus producing an AC signal to transfer across the transformer 106. It follows, the duration of the time period t1 to t2 may be about the same as the duration of time period t0 to t1. Because the duration of the time period t1 to t2 is not controlled by the hybrid signal $V_{SAW}$, the hybrid signal $V_{SAW}$ may be reset in preparation for the next conduction time of the high-side FET 108. In plot 304, the hybrid signal $V_{SAW}$ is shown to be reset to a predetermined, non-zero voltage. However, the reset or start state for the hybrid signal $V_{SAW}$ may take any suitable magnitude. The example cycle starts again in the time period t2 to t3 with the high-side FET 108 becoming conductive.

Figure 4:
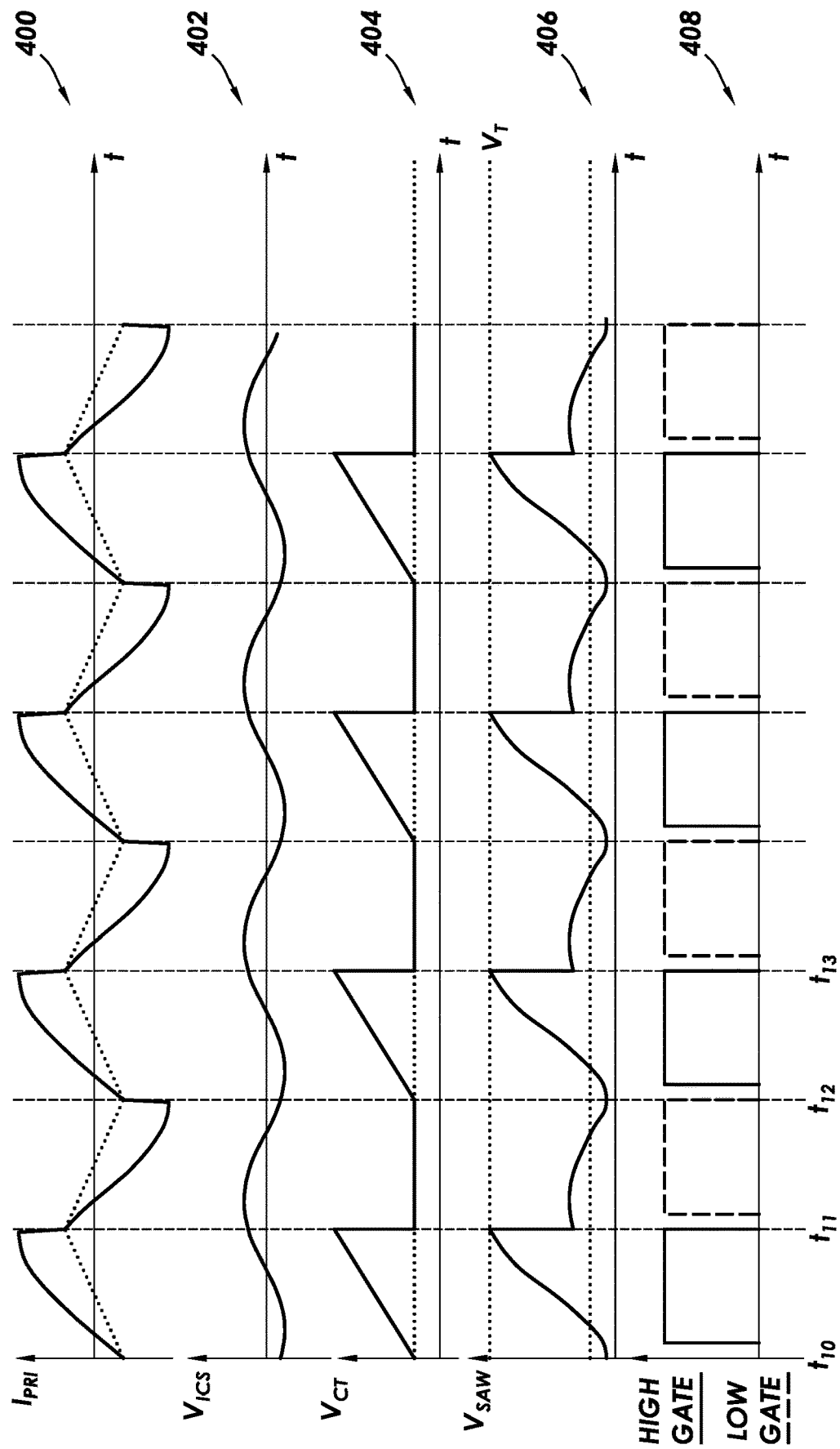
FIG. 4 is a timing diagram in accordance with at least some embodiments.

FIG. 4 is a timing diagram in accordance with at least some embodiments. In particular, FIG. 4 illustrates switching cycles in an operational state of the resonant power converter of FIG. 1 in which the resonant power converter is providing relatively low current and thus low load. Plot 400 shows an example primary current waveform $I_{PRI}$ (solid line) and magnetizing current waveform (dashed line). Plot 402 shows an example waveform of the signal indicative of primary current $V_{ICS}$. Plot 404 shows an example waveform of a ramp signal $V_{CT}$. Plot 406 shows an example waveform of a hybrid signal $V_{SAW}$. And plot 408 shows an example high-gate signal (solid line) and low-gate signal (dashed line). The plots of FIG. 4 are plotted on corresponding time scales; however, the plots are not necessarily to scale.

Time period t10 to t11 represents a period of time in which the high-side FET 108 is conductive and the low-side FET 110 is non-conductive, as shown by plot 408. During the time period t10 to t11 the current through the primary winding $I_{PRI}$ is rising, as shown by plot 400. Because of the RC network associated with the current sense transformer 170, the signal indicative of primary current $V_{ICS}$ lags the primary current, but nevertheless the signal indicative of primary current $V_{ICS}$ follows the primary current, as shown in plot 402. Inasmuch as the example set of plots are representative of the resonant power converter providing relatively low load, the magnetizing current component of the primary current $I_{PRI}$ has a lower peak-to-peak magnitude, and the signal indicative of primary current $V_{ICS}$ likewise has a lower peak-to-peak magnitude.

Still considering time period t10 to t11, consider for purposes of explanation that in the operational state illustrated by the plots of FIG. 4 the resonant power converter has a high voltage error. Stated otherwise, the output voltage $V_{OUT}$ has drifted away from the set point. During the time period t10 to t11 the converter controller 120, and in particular the ramp circuit 234, produces the ramp signal $V_{CT}$. Under the assumptions, the ramp signal $V_{CT}$ has a slope that is relatively high, as shown in plot 404, and in comparison to the slope illustrated the time period t0 to t1 in FIG. 3.

The example converter controller 120, and in particular the on-time control logic 204, produces the hybrid signal $V_{SAW}$. Again, the hybrid signal $V_{SAW}$ is the summation of the signal indicative of primary current $V_{ICS}$ and the ramp signal $V_{CT}$, as shown in plot 406. As before, the converter controller 120 ends the conduction time of the high-side FET 108 when the magnitude of the hybrid signal $V_{SAW}$ crosses the predetermined threshold $V_T$. Thus, at time t11 the high-gate signal is de-asserted, and after a predetermined dead time, the low-gate signal is asserted, as shown in plot 408.

Still considering the time period t10 to t11, the example hybrid signal $V_{SAW}$ is dominated by the ramp signal $V_{CT}$. That is to say, the contribution of the ramp signal $V_{CT}$ outweighs the contribution of the signal indicative of primary current $V_{ICS}$. Stated yet another way, within the time period, the peak magnitude of the ramp signal $V_{CT}$ has a greater contribution to the peak magnitude of the hybrid signal $V_{SAW}$ than the peak magnitude of the signal indicative of primary current $V_{ICS}$. From a control standpoint, having the ramp signal $V_{CT}$ being the predominant portion of the hybrid signal $V_{SAW}$ results in the control strategy being dominated by voltage-mode control. Voltage-mode control is inherently more stable in low current and thus low load situations.

Now consider time period t11 to t12. Time period t11 to t12 represents a period of time in which the low-side FET 110 is conductive and the high-side FET 108 is non-conductive, as shown by plot 408. During the time period t11 to t12 the magnetizing current is falling, as shown by plot 400. Again because of the RC network associated with the current sense transformer 170, the signal indicative of primary current $V_{ICS}$ lags the primary current, but nevertheless the signal indicative of primary current $V_{ICS}$ follows the primary current, as shown in plot 402. As before, the duration of the time period t11 to t12 may be about the same as the duration of time period t10 to t11. Because the duration of the time period t11 to t12 is not controlled by the hybrid signal $V_{SAW}$, the hybrid signal $V_{SAW}$ may be reset in preparation for the next conduction time of the high-side FET 108. The example cycle starts again in the time period t12 to t13 with the high-side FET 108 becoming conductive.

Thus, the converter controller 120 implements a hybrid control technique that is dominated by current-mode control in some operational states (e.g., high current, high load), and the control technique is dominated by voltage-mode control in other operational states (e.g., low current, low load). However, the hybrid control technique does not make an abrupt shift from current-mode control to voltage-mode control, or vice versa, as the state of the power converter changes. Rather, the hybrid control technique operates along a spectrum having current-mode control at one end of the spectrum, and voltage-mode control at the other end of the spectrum. In some cases, the hybrid control is not fully current-mode control even at higher currents and highest loads, as there may still be aspects or contributions that are voltage-mode control. Moreover, in some case the hybrid control is not fully voltage-mode control even at the lowest currents and lowest loads, as there may still be aspects or contributions that are current-mode control. Nevertheless, the hybrid control technique of the example embodiments takes advantage of benefits of both control techniques.

Figure 5:
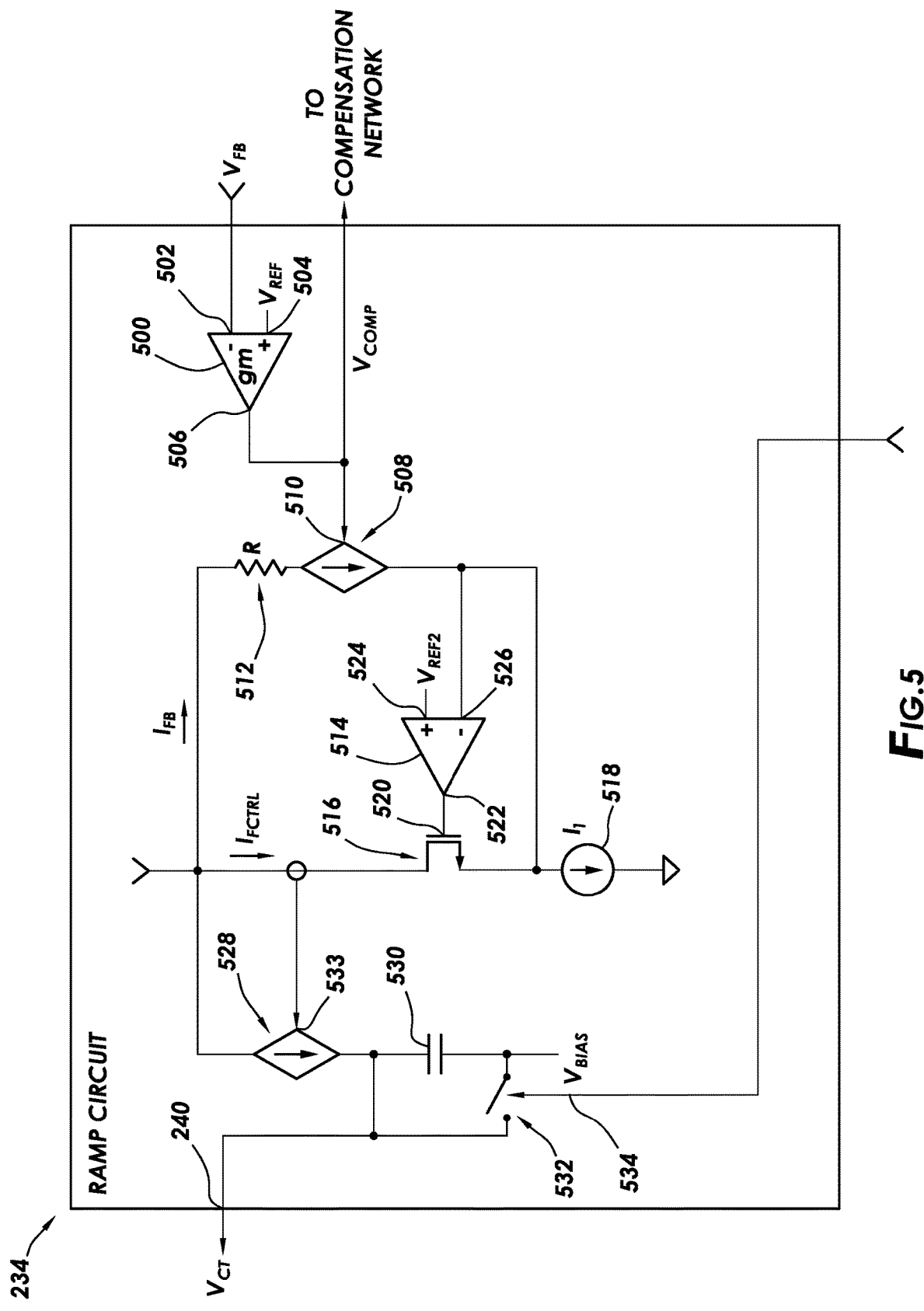
FIG. 5 shows an electrical schematic of an example ramp circuit in accordance with at least some embodiments.

FIG. 5 shows an electrical schematic of an example ramp circuit 234 in accordance with at least some embodiments. In particular, the example ramp circuit 234 includes and an error amplifier 500 defining a inverting input 502, an non-inverting input 504, and an error output 506. The inverting input 502 is coupled to the signal indicative of output voltage. The non-inverting input 504 couples to a reference voltage $V_{REF}$ that may be created in any suitable way, and which reference voltage $V_{REF}$ represents the set point for the output voltage for the overall converter. The error amplifier 500 produces a voltage error signal on the error output 506. The voltage error signal is applied to the compensation network 184 (FIG. 1), which in some cases acts as a low-pass filter for the voltage error signal.

The example ramp circuit further comprises a controlled-current source 508 that defines a control input 510. The control input 510 is coupled to the error output 506 and the compensation network 184, and thus receives a filtered error signal. The filtered error signal controls the magnitude of the current produced by the controlled-current source 508. In the example circuit of FIG. 5, the controlled-current source pulls current from a supply rail V1 through a resistor 512. The current produced by the controlled-current source 508 biases an inverting input 526 of a downstream amplifier 514, as discussed more below. The controlled-current source 508 thus causes a feedback current $I_{FB}$ proportional to the filtered error signal $V_{COMP}$.

Still referring to FIG. 5, the example ramp circuit further comprises a transistor 516 coupled between the voltage rail V1 and a current source 518. The transistor 516, illustratively shown as a FET, defines a gate 520 that is coupled to the amplifier output 522 of the amplifier 514. The amplifier 514 defines a non-inverting input 524 coupled to a reference voltage $V_{REF2}$, and the inverting input 526 is coupled to the current output of the controlled-current source 508 and is coupled to the input of the current source 518. The output of the current source 518 is coupled to ground within with ramp circuit 234. The combination of the transistor 516 and amplifier 514 modulates a control current $I_{FCTRL}$ drawn from the voltage rail V1. In particular, the voltage at the inverting input 526 of the amplifier is based on the current balance of the feedback current $I_{FB}$ through the controlled-current source 508 and the current I1 through the current source 518. As the feedback current $I_{FB}$ increases with increasing voltage error, the control current $I_{FCTRL}$ is reduced by the transistor 516 operating in its active region. Oppositely, as the feedback current $I_{FB}$ decreases with decreasing voltage error, the control current $I_{FCTRL}$ is increased by the transistor 516 operating in its active region.

The example ramp circuit 234 further comprises another controlled-current source 528 that is coupled on its input side to the voltage rail V1, and that is coupled on its output side to a first lead of a ramp capacitor 530. The second lead of the ramp capacitor 530 is coupled to a bias voltage $V_{BIAS}$. The controlled-current source 528 defines a control input 533 coupled (e.g., by way of a current transformer) to the control current $I_{FCTRL}$. Thus, the charging current produced by the controlled-current source 528 and applied to the ramp capacitor 530 is proportional to the control current $I_{FCTRL}$. In accordance with example embodiments, the voltage on the ramp capacitor 530 is the ramp signal $V_{CT}$ (e.g., plot 304 of FIG. 3, or plot 404 of FIG. 4) created by the ramp circuit 234. Thus, the first lead of the ramp capacitor 530 defines the ramp output 240. As the magnitude of the control current $I_{FCTRL}$ increases, the rate of charge of the ramp capacitor increase, and thus the slope ramp signal increase. Oppositely, as the magnitude of the control current $I_{FCTRL}$ decreases, the rate of charge of the ramp capacitor decreases, and thus the slope of the ramp signal decreases.

In order to reset the ramp capacitor for the next cycle, the example circuit comprises a shorting switch 532. The shorting switch is shown as a single pole, single throw switch, but in practice the shorting switch 532 may be implemented using a transistor (e.g., a FET). The shorting switch 532 defines a control input 534 that is coupled to an indication of the state of the high-side FET 108, such as by coupling to the gate status output 212 (FIG. 2) of the cycle control logic 202 (also FIG. 2). However, the control signal used to activate the shorting switch 532 may be provided from any suitable location.

The circuit of FIG. 5 that creates the ramp signal $V_{CT}$ is merely an example. One having ordinary skill, with the benefit of this disclosure, could create a different ramp circuit that nevertheless generates the ramp signal $V_{CT}$ having a slope inversely proportional to the voltage error. Further, the example ramp circuit 234 is designed and constructed with the voltage feedback signal being directly proportional to output voltage; however, in the case of an isolated converter, the voltage feedback signal may be provided by way of an optocoupler, and in such cases the voltage feedback signal would be indirectly proportional to output voltage. Nevertheless, a ramp circuit 234 can still be created that generates the ramp signal $V_{CT}$ having a slope inversely proportional to the absolute voltage error. Moreover, the example ramp circuit 234 is shown to be implemented in analog form using discrete components. However, in other cases the ramp circuit 234 may implemented in any suitable form, such as partially or fully in digital form (e.g., an ASIC, or software executing on a microcontroller or processor).

Figure 6:
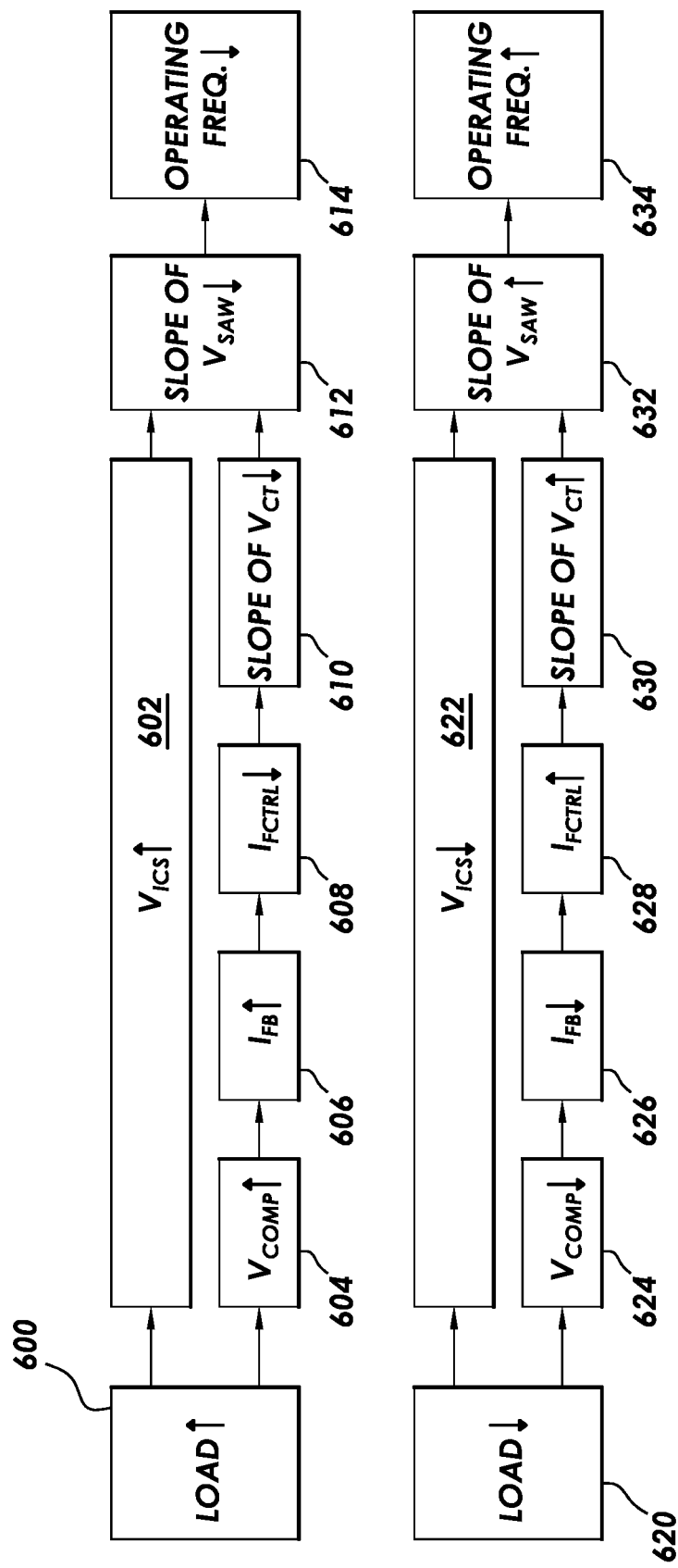
FIG. 6 shows, in block diagram form, a conceptual relationship between various signals in accordance with at least some embodiments.

FIG. 6 shows, in block diagram form, a conceptual relationship between various internal and external signals associated with the ramp circuit 234 in accordance with at least some embodiments. In particular, the upper row of boxes represents load increasing, and the lower row of boxes represents load decreasing. Considering the load increasing case first. As load increases as indicated in block 600, the peak magnitude of the signal indicative of primary current $V_{ICS}$ likewise increases, as indicated in block 602. Because load is increasing in this example, the voltage error is increasing, and thus the $V_{COMP}$ signal is likewise increasing, as indicated in block 604. An increasing $V_{COMP}$ signal results in an increasing feedback current $I_{FB}$, as indicated in block 606. An increasing feedback current $I_{FB}$ results in a decreasing control current $I_{FCTRL}$, as indicated in block 608. The decreasing control current $I_{FCTRL}$ results in the slope of the ramp signal $V_{CT}$ decreasing, as indicated in block 610. The decreasing slope of the ramp signal $V_{CT}$ results in a decreasing slope of the hybrid signal $V_{SAW}$, as indicated in block 612, which ultimately results in lowing the operating frequency toward the resonant frequency, as indicated in block 614.

Still referring to FIG. 6, and particularly the lower row of boxes, as load decreases as indicated in block 620, the peak magnitude of the signal indicative of primary current $V_{ICS}$ likewise decreases, as indicated in block 622. Because load is decreasing in this example, the voltage error is decreasing, and thus the $V_{COMP}$ signal is likewise decreasing, as indicated in block 624. A decreasing $V_{COMP}$ signal results in a decreasing feedback current $I_{FB}$, as indicated in block 626. A decreasing feedback current $I_{FB}$ results in an increasing control current $I_{FCTRL}$, as indicated in block 628. The increasing control current $I_{FCTRL}$ results in the slope of the ramp signal $V_{CT}$ increasing, as indicated in block 630. The increasing slope of the ramp signal $V_{CT}$ results in an increasing slope of the hybrid signal $V_{SAW}$, as indicated in block 632, which ultimately results in raising the operating frequency away from the resonant frequency, as indicated in block 634.

Figure 7:
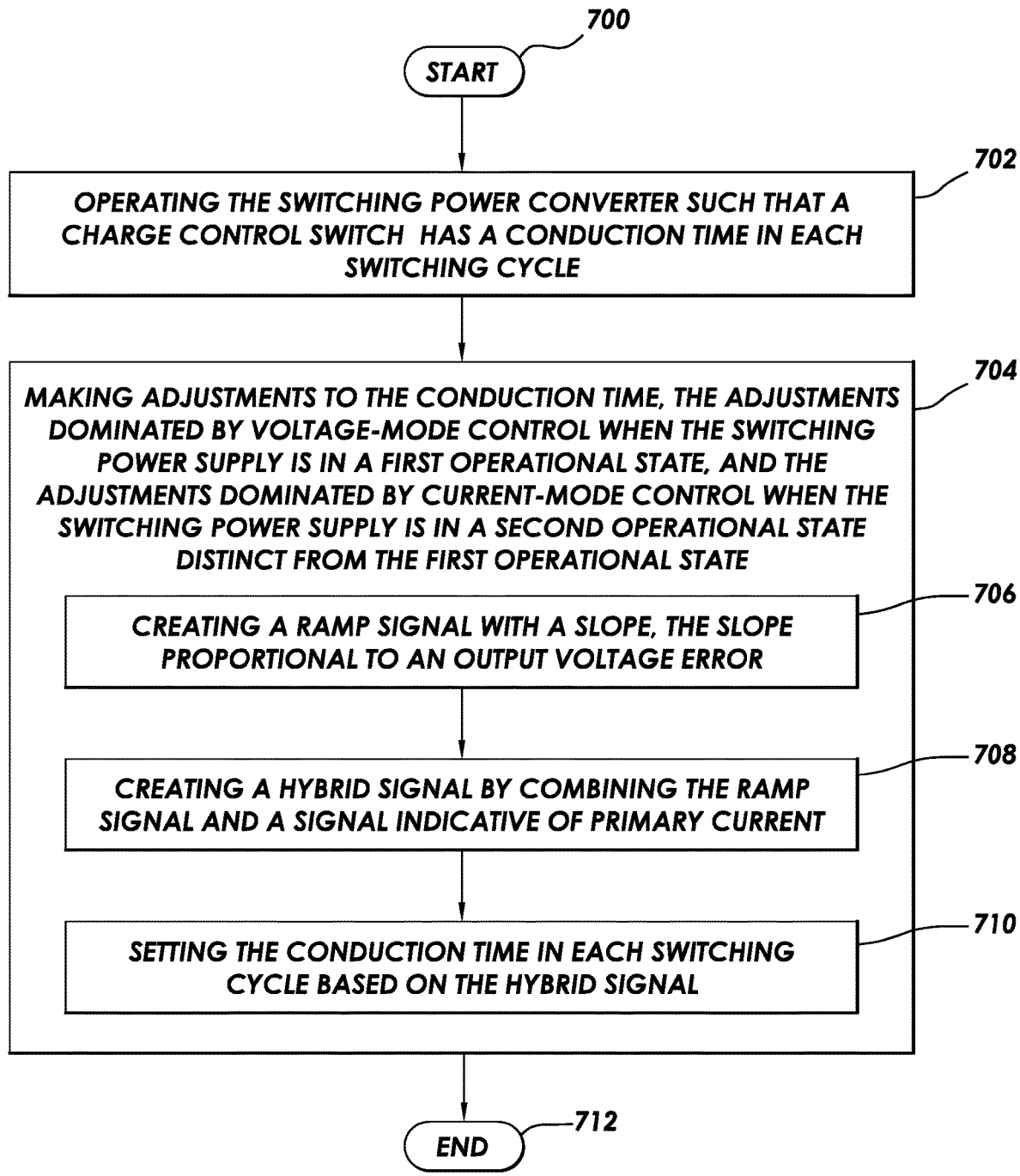
FIG. 7 shows a method in accordance with at least some embodiments.

FIG. 7 shows a method in accordance with at least some embodiments. In particular, the method starts (block 700) and comprises: operating the switching power converter such that a charge control switch has a conduction time in each switching cycle (block 702); and making adjustments to the conduction time, the adjustments dominated by voltage-mode control when the switching power supply is in a first operational state, and the adjustments dominated by current-mode control when the switching power supply is in a second operational state distinct from the first operational state (block 704). Making adjustments may comprise: creating a ramp signal with a slope, the slope proportional to an output voltage error (block 706); creating a hybrid signal by combining the ramp signal and a signal indicative of primary current (block 708); and setting the conduction time in each switching cycle based on the hybrid signal (block 710). Thereafter, the method ends (block 712).

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a switching power converter, the method comprising:
   operating the switching power converter such that a charge control switch has a conduction time in each switching cycle;
   making adjustments to the conduction time, the adjustments dominated by voltage-mode control and having a current-mode control contribution when the switching power converter is in a first operational state, and the adjustments dominated by the current-mode control and having the voltage-mode control contribution when the switching power converter is in a second operational state distinct from the first operational state, the making adjustments by:
   creating a ramp signal with a slope, the slope proportional to an output voltage error;
   creating a hybrid signal by combining the ramp signal and a signal indicative of primary current; and
   setting the conduction time in each switching cycle based on the hybrid signal.

2. The method of claim 1 wherein the first operational state is providing a first output current, and wherein the second operational state is a second output current higher than the first output current.

3. The method of claim 1 wherein the first operational state is providing a first power level, and wherein the second operational state is a second power level higher than the first power level.

4. The method of claim 1 wherein increasing slope increases contribution of the voltage-mode control.

5. The method of claim 1 wherein decreasing slope decreases contribution of the voltage-mode control.

6. The method of claim 1 wherein setting the conduction time in each switching cycle further comprises ending a conduction mode of the charge control switch when a magnitude of the hybrid signal crosses a predetermined threshold.

7. The method of claim 6:
wherein ending the conduction mode further comprises ending the conduction mode of a high-side switch, the ending of the conduction mode defines an on time;
and the method further comprises, after ending the conduction mode of the high-side switch, making a low-side switch conductive for the on time.

8. The method of claim 1 wherein operating the switching power converter further comprises operating an inductor-inductor-capacitor (LLC) resonant converter.

9. A primary-side controller for a switching power converter comprising:
a first gate terminal, a current sense terminal, and a voltage feedback terminal;
a cycle control logic defining a first gate output and a trigger input, the first gate output coupled to the first gate terminal, the cycle control logic configured to de-assert the first gate output based on assertion of the trigger input;
an on-time control logic coupled to the trigger input, the current sense terminal, and the voltage feedback terminal, the on-time control logic configured to:
create a voltage error signal based on a signal indicative of output voltage sensed on the voltage feedback terminal;
create a ramp signal with a slope, the slope proportional to the voltage error signal;
create a hybrid signal by combining the ramp signal and a signal indicative of current in a primary winding sensed on the current sense terminal; and
assert the trigger input of the cycle control logic when a magnitude of the hybrid signal crosses a predetermined threshold.

10. The primary-side controller of claim 9 wherein the cycle control logic further comprises:
a start control circuit defining a start output, wherein the start control circuit asserts the start output a switching frequency; and
a latch defining a start input, a stop input, and a latch output, the start input coupled to the start output, and the stop input coupled to the trigger input, wherein the latch asserts the latch output based on assertion of the start input, and the latch de-asserts the latch output based on assertion of the stop input.

11. The primary-side controller of claim 10 further comprising the start control circuit configured to assert the start output at the switching frequency that is fixed.

12. The primary-side controller of claim 10 further comprising the start control circuit is configured to assert the start output at the switching frequency that is variable and based on an asserted time of the latch output.

13. The primary-side controller of claim 9 further comprising:
a second gate terminal;
the cycle control logic defining a second gate output coupled to the second gate terminal;
wherein the cycle control logic is configured to:
assert the first gate terminal, and de-assert the first gate terminal responsive to assertion of the trigger input;
measure an on time of the first gate terminal;
assert the second gate terminal for the on time.

14. A switching power converter comprising:
a first switch associated with a first inductance;
a current sensor associated with the first inductance;
an output voltage node defined by the switching power converter;
a converter controller comprising:
a cycle control logic defining a first gate output coupled to a control input of the first switch, and a trigger input, the cycle control logic configured to de-assert the control input of the first switch based on assertion of the trigger input;
an on-time control logic coupled to the trigger input, the current sensor, and the output voltage node, the on-time control logic configured to:
create a voltage error signal based on a signal indicative of output voltage sensed from the output voltage node;
create a ramp signal with a slope, the slope proportional to the voltage error signal;
create a hybrid signal by combining the ramp signal and a signal indicative of current sensed from the current sensor; and
assert the trigger input of the cycle control logic when a magnitude of the hybrid signal crosses a predetermined threshold.

15. The switching power converter of claim 14 wherein the cycle control logic further comprises:
a start control circuit defining a start output, wherein the start control circuit asserts the start output a switching frequency; and
a latch defining a start input, a stop input, and a latch output, the start input coupled to the start output, and the stop input coupled to the trigger input, wherein the latch asserts the latch output based on assertion of the start input, and the latch de-asserts the latch output based on assertion of the stop input.

16. The switching power converter of claim 15 further comprising the start control circuit configured to assert the start output at the switching frequency that is fixed.

17. The switching power converter of claim 15 further comprising the start control circuit is configured to assert the start output at the switching frequency that is variable and based on an asserted time of the latch output.

18. The switching power converter of claim 14 further comprising:
a primary winding of a transformer that defines the first inductance;
a second switch associated with the primary winding;
the cycle control logic defining a second gate output coupled to a control input of the second switch;
wherein the cycle control logic is configured to:
assert the control input of the first switch, and de-assert the control input of the first switch responsive to assertion of the trigger input;
measure a conduction time of the first switch; and
assert the control input of the second switch for the conduction time.

19. The switching power converter of claim 18 wherein the primary winding is arranged as an inductor-inductor-capacitor (LLC) primary.

* * * * *